United States Patent [19]

Miyake et al.

[11] 4,374,217

[45] Feb. 15, 1983

[54] COLD-SETTING STARCH ADHESIVE

[75] Inventors: Kanichi Miyake, Fujisawa; Masahiro Tokuda, Yokohama; Takaaki Aoki, Yokohama; Hideaki Miyakawa, Yokohama; Yasuo Tamura, Yokohama, all of Japan

[73] Assignee: Hohnen Oil Co., Ltd., Tokyo, Japan

[21] Appl. No.: 335,550

[22] Filed: Dec. 29, 1981

[30] Foreign Application Priority Data

Jan. 14, 1981 [JP] Japan .................................. 56-4200
Apr. 7, 1981 [JP] Japan ................................. 56-51941

[51] Int. Cl.$^3$ ........................... C08L 3/00; C08L 3/04
[52] U.S. Cl. ..................................... 524/47; 106/210; 106/211; 106/213; 524/49; 524/50; 524/51; 524/52; 428/532
[58] Field of Search ............... 106/210, 211, 212, 213, 106/214; 524/13, 27, 47, 49, 50, 51, 52, 425, 445, 702; 427/391; 252/315; 428/532, 533

[56] References Cited

U.S. PATENT DOCUMENTS

| 2,544,714 | 3/1951 | Moore ................................. 524/47 |
| 2,583,268 | 1/1952 | Lolkema et al. ....................... 524/47 |
| 2,957,834 | 10/1960 | Möller et al. ......................... 524/49 |
| 3,137,592 | 6/1964 | Protzman et al. ................... 106/210 |
| 3,734,760 | 5/1973 | Hijiya et al. ........................ 106/210 |

Primary Examiner—John Kight, III
Assistant Examiner—Nathan M. Nutter
Attorney, Agent, or Firm—Stevens, Davis, Miller & Mosher

[57] ABSTRACT

A cold-setting starch adhesive comprising the mixture of three different types of corn starch having widely different properties, i.e., high amylose corn starch having an amylose content of at least 50%, ordinary corn starch and waxy corn starch, in specific proportions. The adhesive shows excellent properties due to the effective combination of the outstanding properties of the individual types of starch.

14 Claims, No Drawings

COLD-SETTING STARCH ADHESIVE

BACKGROUND OF THE INVENTION

1. Field of the Invention

This invention relates to a cold-setting starch adhesive which is suitable for use in the manufacture of corrugated fibreboard.

2. Description of the Prior Art

Starch adhesive has been commonly used in the manufacture of corrugated fibreboard. Known starch adhesives generally consist mainly of ungelatinized starch paste. Thus, they are used by Stein-Hall process. That is, after the starch paste is firstly gelatinized to sticky paste by steam heating and treatment with caustic soda solution, it is successively applied to the tips of corrugated medium to be bonded to the liner to form corrugated fibreboard, and subsequent heating of the corrugated fibreboard vaporize the water from the paste to dryness to complete the setting.

The heat energy consumed by the corrugating operation of Stein-Hall process occupies the major part of the total energy consumption in corrugated fibreboard manufacturing plants. If the heating procedure can be eliminated from the corrugating operation, it will contribute to energy saving in corrugated fibreboard manufacturing plants. It has, therefore, been of great interest to the corrugated fibreboard industry to develop a cold-corrugating process which does not require any heating procedure at the corrugating step of corrugated fibreboard.

Some hot-melt adhesives obtained as petrochemical product is known as being cold-setting. They, however, have the following disadvantages. The raw materials of the hot-melt adhesives are becoming less available because of the high price of petroleum. Used corrugated fibreboard made by employing a hot-melt adhesive is difficult to recover and reuse. Accordingly, it has been strongly desired to develop a cold-setting corn starch adhesive for use in the manufacture of corrugated fibreboard.

Certain properties are required for a cold-setting corn starch adhesive which is to be used for bonding in the manufacture of corrugated fibreboard without heating procedure. That is, the paste solution must have high solid content, so that it may contain only a small quantity of water to be vaporized. It must be able to gel rapidly, as it is required to set immediately after the application to the fibreboard surfaces to be bonded together.

Other properties are also required for an adhesive for use in the manufacture of corrugated fibreboard, namely, during the manufacture of corrugated fibreboard, production speed of as high as possible is desired on a corrugator in normal operation, while it must be slowed down when a small lot of products is manufactured, or at the beginning or the end of the operation. It is, therefore, necessary to employ an adhesive having a constant gluing ability irrespective of the production speed, whether it may be high or low. This requirement is nowadays of increasing importance, since the operation speed on a corrugator is as high as 250 meters per minute.

However, ordinary corn starch adhesives, when they are used as cold-corrugating adhesives, tend to gel so slowly that unsatisfactory setting appears if the operating speed of the corrugator is increased, and even a slight external force can cause the separation of the glued surfaces when, for example, the corrugated fibreboard is cut to a prescribed size. Therefore, when they are used as cold-corrugating adhesives in the process of manufacturing corrugated fibreboard, the efficiency of the process is far inferior as compared when they are used in Stein-Hall process.

Japanese Laid-Open Patent Specification No. 32570/1981 discloses a cold-corrugating adhesive for corrugated fibreboard having improved glueability at high production speed. This adhesive consists mainly of high amylose corn starch instead of ordinary corn starch which is the main component of all the known starch adhesives. High amylose corn starch is a starch prepared from specialty corn created by selective breeding. It contains at least 50% of amylose, while ordinary corn starch contains only about 25% of amylose.

Because of its high amylose content, high amylose corn starch has a variety of outstanding properties, for example:

(a) It is hard to be gelatinized under normal conditions;
(b) it can form high solid paste;
(c) it is highly susceptible to retrogradation;
(d) it forms strong film; and
(e) it has high glueability.

Some of these properties of high amylose corn starch make it a very suitable substance which can impart rapid glueability to cold-corrugating adhesive for use in the manufacture of corrugated fibreboard. As already pointed out, paste prepared from cold-corrugating starch adhesive must have high solid concentration when it is used at higher operating speed so that it may contain only a small amount of water to be vaporized, and must be capable of gelling rapidly after the application to the fibreboard surfaces to be bonded together. These requirements are fully satisfied by the properties (b) to (e) of high amylose corn starch.

The high amylose corn starch adhesive disclosed in Japanese Laid-Open Patent Specification No. 32570/1981 is, thus, partly satisfactory for application at higher operating speed. It, however, retrogrades and dries too rapdily, and can retain only a small amount of water. Consequently, if the operating speed is low, it is likely to solidify on the applicator roll, or on the fluit tip of the corrugating medium before bond it with the liner. Thus the adhesive from high amylose corn starch cannot show satisfactory glueability outside of only a narrow range of operating speeds. The use thereof for application at lower operating speed is likely to result in an increased percentage of defective bond.

Another problem resides in the quality of the material which is available for making corrugated fibreboard. Recent shortage of pulp resources makes it difficult to obtain good pulp, and necessitates the use of fibreboard material of lower strength for making corrugated fibreboard. Synthetic resins, or other reinforcing agents are often added to the material in order to compensate the deficient strength. Synthetic resins are sometimes added purely for the purpose of producing reinforced liner or medium having improved strength irrespective of the quality of the pulp. The adhesive prepared from high amylose or ordinary corn starch is, however, very unsatisfactory for gluing any such resin-reinforced liner or medium.

Under these circumstances, it has hitherto been considered impossible to produce from starch a cold-corrugating adhesvie for corrugated fiberboard which shows high glueability both at higher and lower operating speeds.

SUMMARY OF THE INVENTION

It is an object of this invention to provide a cold-corrugating starch adhesive which is sutiable for corrugated fibreboard.

It is another object of this invention to provide a cold-corrugating starch adhesive which is satisfactorily applicable both at higher and lower operating speeds, and which does not require heating during application, and can, therefore, contribute to energy saving in the manufacture of corrugated fibreboard.

It is still another object of this invention to provide a cold-corrugating starch adhesive which shows satisfactory glueability for any type of material employed in the manufacture of corrugated fibreboard.

It is a further object of this invention to provide a water-resistant, energy-saving adhesive which is satisfactorily applicable both at higher and lower operating speeds, and which does not require heating during application.

DETAILED DESCRIPTION OF THE INVENTION

This invention provides a cold-corrugating starch adhesive which is satisfactorily applicable both at higher and lower operating speeds for making corrugated fibreboard by a corrugator.

The inventors of this invention have discovered that the combined use of high amylose corn starch, ordinary corn starch and waxy corn starch surprisingly produces a cold-corrugating starch adhesive suitable for corrugated fibreboard, which is satisfactorily applicable at lower operating speed, while retaining the rapid glueability which is characteristic of high amylose corn starch.

Thus, this invention provides a cold-corrugating starch adhesive in the form of a hot aqueous high solid paste of gelatinized starch which comprises 20 to 80% by weight of high amylose corn starch having an amylose content of at least 50%, or any modified form thereof, 10 to 79% by weight of ordinary corn starch or any modified form thereof, and 1 to 10% by weight of waxy corn starch (total is 100% by weight).

If the proprotion of high amylose corn starch is less than 20% by weight, no satisfactory glueability is obtained at higher operating speed, while no satisfactory glueability is obtained at lower speed if less than 10% by weight of ordinary corn starch is employed.

The most important feature of this invention resides in the fact that the ashesive is endowed with improved glueability at lower operating speed, while retaining high glueability at higher operating speed by the incorporation of waxy corn starch into a mixture of high amylose corn starch and ordinary corn starch.

Waxy corn starch does not contain amylose, and consists solely of amylopectin. Therefore, it has a number of properties which are different from these of high amylose corn starch. For example, it is (a) easy to be gelatinized, (b) higher sticky, and (c) capable of holding large amount of water. The high glueability of the adhesive of this invention at lower operating speed is due to the presence of waxy corn starch. It provides a starch paste with an improved water-holding capacity during gluing at lower speed and it prevents any undersirable solidification of the paste on the applicator roll, or drying or solidification of the paste before the completion of the gluing speration.

The adhesive of this invention containing waxy corn starch is satisfactorily applicable also to the aforementioned resin-reinforced liner or medium as opposed to any known adhesive not containing waxy starch.

If the proportion of waxy corn starch is less than 1% by weight, however, it is difficult to expect the improved glueability of the adhesive at lower gluing speed, while a paste containing more than 10% by weight of waxy corn starch is too stringy to be applied uniformly by rolls.

It is surprising that the advantages of the three different types of starch in the adhesive of this invention exhibit themselves to the maximum extent without cancelling one another. This is only possible as a result of the combination of the three different types of starch. Such adhesive having high glueability both at higher and lower operating speeds as that of the present invention would not be obtained from the mixture of only high amylose and waxy corn starches, nor from the mixture of high amylose and ordinary corn starches in any proportion.

A method for preparing the cold-corrugating starch adhesive may comprise adding water to a mixture of high amylose, ordinary and waxy corn starches, and if required, an oxidizing agent such as persulfate or perborate; gelation promotor such as boric acid, borax or a sulfite; pH adjustor such as sodium hydroxide, or the like, mixing them together, and heating the resulting mixture to the temperature of between 80° C. and 100° C. by conventional method, e.g. by using a cooking device such as jet cooker, autoclave or Onlator (indirect heating cooker) to give a hot high solid paste of gelatinized starch with a viscosity of between 500 and 1500 cps and having a solid content of 20–50% by weight. This paste is applied to the fibreboard surfaces to be glued together, and them immediately allowed or forced to cool, whereby the paste sets rapidly to produce strong adhesion.

The adhesive of this invention may contain, as high amylose corn starch having an amylose content of at least 50%, any modified form thereof obtained by oxidizing, etherifying, esterifying, or otherwise treating the starch in a known manner. Such modification of high amylose corn starch by oxidation, etherification, esterification, or the like makes it easier to form a gelatinized paste, and to prepare a more homogeneous and stable paste.

The modification of ordinary corn starch by a known method such as crosslinking, etherification or the like is also useful for obtaining an adhesive of improved glueability in the form of a short stringy paste having an improved water-holding capacity. Waxy corn starch may likewise be modified, if required.

The adhesive of this invention may shrink when it sets. In order to prevent such shrinkage, it is possible to add any known inorganic or organic filler, such as bentonite, clay, calcium carbonate, ground wood powder, walnut shell flour or coconut shell flour, so that a stronger adhesive layer may be obtained. The filler may be added in the amount of 1 to 100%, preferably 2 to 20%, by weight based on the starch, depending on the filler which is employed. The smaller amount less than 1% is not effective, while the addition of greater than 100% is likely to bring about disadvantages, such as lower glueability.

If water resistance is required for the adhesive of this invention formaldehyde resin solution can be incorporated. It is possible to use urea-formaldehyde resin solution, melamine-formaldehyde resin solution, resorcinol-formaldehyde resin solution, or ketone-formaldehyde resin solution, or a mixture or co-condensation resin solution thereof, or a solution of any such resin modified with acetoguanamine, thiourea, ethylene urea, phenol, cresol, ethylenediamine, diethylenetriamine, or the like.

Such formaldehyde resin solution is usually employed in the quantity of 5 to 50% by weight based on the total starch amount, considering the effect and the expense of the resin solution. More preferably, it is employed in 10 to 25% by weight. The formaldehyde resin solution, when employed in the prescribed range of quantity, imparts outstanding water resistance to the adhesive of this invention without impairing its glueability at both higher and lower operating speeds. It may be added into the high solid gelatinized paste prepared as hereinabove described, after the pH of the paste has been adjusted to a range of 4 to 7.

The water-resistant adhesive thus prepared in the form of a hot high solid paste of gelatinized starch is particularly suitable for use in the manufacture of water-resistant corrugated fibreboard. The adhesive is applied to the fibreboard surfaces to be glued together, and after the surfaces have been glued together, the adhesive is immediately allowed or forced to cool, whereupon it sets rapidly, and corrugated fibreboard with strong, water-resistant adhesion is obtained.

The cold-setting starch adhesive of this invention shows outstanding glueability at both higher and lower operating speeds. As it can accomplish strong adhesion without heating during the corrugating operation, it contributes greatly to reducing the consumption of heat energy in corrugated fibreboard manufacturing plants. It does not cause any appreciable inconvenience in the recovery and reuse of used corrugated fibreboard, as compared to petrochemical hot-melt adhesives.

Although the adhesive of this invention is particularly useful in the manufacture of corrugated fibreboard, it is, of course, equally applicable to ordinary paper, cloth, wood, plastics, inorganic material, or any other material in general.

The invention will now be described with reference to examples thereof.

EXAMPLE 1

Sixty parts by weight of high amylose corn starch having an amylose content of 70%, 35 parts by weight of ordinary corn starch, and 5 parts by weight of waxy corn starch were suspended in 186 parts by weight of water. Added into the suspension were 2 parts by weight of sodium persulfate, 0.5 part by weight of sodium sulfite, 2 parts by weight of boric acid and 1 part by weight of sodium hydroxide. Gelatinized paste was formed from the resulting mixture by a continuous paste forming apparatus (Onlator of Sakura Seisakusho, Japan). 50% by weight aqueous solution of sodium hydroxide was added into the paste to adjust the pH value to 9.0, whereby there was obtained a cold-setting starch adhesive in the form of a gelatinized paste having a temperature of about 90° C. and a solid content of about 33% by weight.

The glueability of the adhesive was tested by applying it to the single-face of the fibreboard by a testing corrugator both at a low operating speed of 4 m/min. and at a high operating speed of 20 m/min. For this test, the hot high solid gelatinized paste was maintained at a temperature of about 90° C., and applied to the flute tip of the corrugating medium at an application rate of about 5 g/m$^2$ (dry weight). After a kraft liner had been placed on the corrugating medium, cold air was blown against the paste to cool and set it, whereby glued corrugated fibreboard was obtained. K liner-280 of Honshu Paper Co., Japan, SCP 125 of Honshu Paper Co. and MM 180 of Honshu Paper Co. were used as the liner, the corrugating medium and the reinforced corrugating medium respectively.

From this fibreboard, test pieces of 8×5 cm were cut out and tested for adhesion strength by a compression testing machine in accordance with JIS (Japanese Industrial Standards) Z-0402. The results, as well as those of the other examples, are shown in TABLE 1 below.

EXAMPLE 2

An aqueous suspension was prepared from 350 g of high amylose corn starch having an amylose content of 70% in 400 ml of water at 40° C. 3% aqueous solution of sodium hydroxide was added into the suspension to adjust the pH value to 11.5. Into this starch suspension was further added 28 ml of 50% aqueous solution of 3-chloro-2-hydroxypropyltrimethylammonium salt. The resulting solution was stirred for four hours at 40° C. After hydrochloric acid had been added into the solution to adjust the pH value to 6.5, the solid content of the solution was separated and washed with water, and dried, whereby cationic high amylose corn starch was obtained.

The procedures of EXAMPLE 1 were repeated, except for using 60 parts by weight of the cationic high amylose corn starch, 35 parts by weight of commercially available etherified ordinary corn starch (hydroxyethyl corn starch 5-B of Nippon Shokubai Kagaku Kogyo, Japan), and 5 parts by weight of waxy corn starch, and there was obtained a cold-setting starch adhesive in the form of a gelatinized paste of about 90° C., and a concentration of about 33% by weight.

The adhesive was used to make corrugated fibreboard in accordance with the procedures described in EXAMPLE 1, and the adhesion strength of the fibreboard was tested as described in EXAMPLE 1.

COMPARATIVE EXAMPLE 1

The procedures of EXAMPLE 1 were repeated to prepare a hot high solid gelatinized paste, except for using only ordinary corn starch having an amylose content of 24%, and corrugated fibreboard was made from this paste to test its adhesion strength as in EXAMPLE 1.

COMPARATIVE EXAMPLE 2A

The procedures of EXAMPLE 1 were repeated to prepare a hot high solid gelatinized paste, except for using 100 parts by weight of high amylose corn starch of an amylose content of 70%, and corrugated fibreboard was made from this paste to test its adhesion strength as in EXAMPLE 1.

COMPARATIVE EXAMPLE 2B

The procedures of COMPARATIVE EXAMPLE 2A were repeated, except for using 60 parts by weight of high amylose corn starch of an amylose content of 70% and 40 parts by weight of ordinary corn starch, while using no waxy corn starch.

The results of the foregoing examples are shown in TABLES 1 and 2 below. TABLE 1 shows the results of the adhesion strength tests conducted on corrugated fibreboard prepared by employing SCP 125 of Honshu Paper Co. as the corrugating medium, while TABLE 2 shows the test results on corrugated fibreboard prepared by employing MM 180 of Honshu Paper Co. as the reinforced corrugating medium.

TABLE 1

| | Adhesion strength (kg) | |
|---|---|---|
| | Corrugated fibreboard obtained at an operating speed of 4 m/min. | Corrugated fibreboard obtained at an operating speed of 20 m/min. |
| Example 1 (invention) | 19.3 | 19.8 |
| Example 2 (invention) | 19.6 | 20.4 |
| Comparative Example 1 | 14.3 | Gluing impossible |
| Comparative Example 2A | 17.1 | 19.2 |
| Comparative Example 2B | 16.7 | 18.8 |

NOTE:
The testing machine had a variable speed of 0 to 20 m/min.

TABLE 2

| | Adhesion strength (kg) | |
|---|---|---|
| | Corrugated fibreboard obtained at an operating speed of 4 m/min. | Corrugated fibreboard obtained at an operating speed of 20 m/min. |
| Example 1 (invention) | 18.1 | 17.9 |
| Example 2 (invention) | 19.8 | 18.4 |
| Comparative Example 1 | 10.4 | Gluing impossible |
| Comparative Example 2A | 12.6 | 14.1 |
| Comparative Example 2B | 12.1 | 13.4 |

As is obvious from the test results shown in TABLES 1 and 2, the adhesives of this invention showed excellent glueability at both high and low operating speeds.

On the other hand, the conventional adhesive of COMPARATIVE EXAMPLE 1 comprising only ordinary corn starch was found inapplicable for operating at a high speed. The high amylose corn starch adhesive of COMPARATIVE EXAMPLE 2A was very poor in glueability at a low speed.

The adhesive of COMPARATIVE EXAMPLE 2B comprising high amylose corn starch and ordinary corn starch was inferior in glueability at both high and low speeds to the adhesive of this invention. The adhesive of COMPARATIVE EXAMPLE 2B was also found to show an undesirable variation in glueability depending on the material from which corrugated fibreboard was formed.

EXAMPLE 3

A gelatinized paste was prepared in accordance with the procedures in EXAMPLE 1. After 50% by weight aqueous solution of sodium hydroxide had been added to this paste to adjust the pH value to 6.0, 20 parts by weight of a urea resin solution (UW-062 of Hohnen Oil Co., Japan) were added into the paste, and mixed to obtain a cold-setting, water-resistant starch adhesive in the form of a gelatinized paste of a temperature of about 90° C. and a solid content of about 35% by weight.

The glueability of the adhesive was tested by applying it to the single-face of the fibreboard by a testing corrugator both at a low operating speed of 4 m/min. and at a high operating speed of 20 m/min. For this test, the hot high solid gelatinized paste was maintained at a temperature of about 90° C., and applied to the flute tip of the water-resistant corrugating medium (SSCP 125 of Honshu Paper Co.) at an application rate of about 10 g/cm² (dry weight). After a water-resistant liner (SK 280 of Honshu Paper Co.) had been placed on the corrugating medium, cold air was blown against the paste to cool and set it, whereby corrugated fibreboard was obtained.

From this fibreboard, test pieces of 8×5 cm were cut out and after the specimens had been immersed for one hour in water at 20° C., they were tested for water-resistant adhesion strength by a compression testing machine. The results, as well as those of other examples, are shown in TABLE 3 below.

EXAMPLE 4

Cationic high amylose corn starch was prepared in accordance with the procedures of EXAMPLE 2. A gelatinized paste having a pH value of 7.0 was prepared in accordance with the procedures of EXAMPLE 3 from 60 parts by weight of the cationic high amylose corn starch, 35 parts by weight of commercially available etherified ordinary corn starch (hydroxyethyl corn starch 5-B of Nippon Shokubai Kagaku Kogyo, Japan), and 5 parts by weight of waxy corn starch. To this paste was added 15 parts by weight of a melamine-formaldehyde resin solution ML-044 of Hohnen Oil Co.), and there was obtained a cold-setting, water-resistant starch adhesive in the form of a gelatinized paste of a temperature of about 90° C. and a concentration of about 35% by weight.

The procedures of EXAMPLE 3 were repeated to made water-resistant corrugated fibreboard from the adhesive thus obtained, and to test its water-resistant adhesion strength.

COMPARATIVE EXAMPLE 3

The procedures of EXAMPLE 3 were repeated for preparing a hot high solid gelatinized paste except for using only ordinary corn starch having an amylose content of 24%, and water-resistant corrugated fibreboard was made from this paste to test its water-resistant adhesion strength.

COMPARATIVE EXAMPLE 4

The procedures of EXAMPLE 3 were repeated for preparing a hot high solid gelatinized paste except for using only high amylose corn starch having an amylose content of 70%, and water-resistant corrugated fibreboard was made from this paste to test its water-resistant adhesion strength.

COMPARATIVE EXAMPLE 5

The procedures of EXAMPLE 3 were repeated for preparing a hot high solid gelatinized paste except that no urea-formaldehyde resin solution was employed, and water-resistant corrugated fibreboard was made from this paste to test its water-resistant adhesion strength.

The test results obtained in the foregoing examples are shown in TABLE 3 below.

TABLE 3

| | Water-resistant adhesion strength (kg) | |
| --- | --- | --- |
| | Corrugated fibreboard obtained at an operating speed of 4 m/min. | Corrugated fibreboard obtained at an operating speed of 20 m/min. |
| Example 3 (invention) | 3.85 | 3.72 |
| Example 4 (invention) | 4.29 | 4.18 |
| Comparative Example 3 | 1.70 | Gluing impossible |
| Comparative Example 4 | 1.28 | 3.67 |
| Comparative Example 5 | Separated | Separated |

NOTE:
The testing machine had a variable speed of 0 to 20 m/min.

As is obvious from the results shown in TABLE 3, the water-resistant, cold-setting starch adhesive of this invention showed excellent water-resistant adhesion both when applied at a high operating speed, and at a low operating speed.

What is claimed is:

1. A cold-setting starch adhesive comprising hot high solid aqueous paste of gelatinized starch containing as adhesive component a mixture of 20 to 80% by weight of unmodified or modified high amylose corn starch having an amylose content of at least 50%, 10 to 70% by weight of unmodified or modified ordinary corn starch, and 1 to 10% by weight of waxy corn starch.

2. A water-resistant, cold-setting starch adhesive comprising hot high solid aqueous paste of gelatinized starch containing as adhesive component a mixture of 20 to 80% by weight of unmodified or midified high amylose corn starch having an amylose content of at least 50%, 10 to 79% by weight of unmodified or modified ordinary corn starch, and 1 to 10% by weight of waxy corn starch, and formaldehyde resin solution.

3. An adhesive as set forth in claim 1 or 2, wherein the temperature of said paste is 80° C. to 100° C.

4. An adhesive as set forth in any one of claims 1 to 3, wherein the solid content of said paste is 20 to 50% by weight.

5. An adhesive as set forth in claim 1, wherein said modified high amylose corn starch is a product produced by oxidation, etherification, esterification, or like treatment of high amylose corn starch to facilitate its gelatinization.

6. An adhesive as set forth in claim 1, wherein said processed product of regular corn starch is the product of crosslinking, etherification, or like treatment which alters the viscosity or water retaining capacity of said paste.

7. An adhesive as set forth in claim 1, which further contains one or more fillers selected from the group consisting of bentonite, clay, calcium carbonate, wood meal, walnut shell flour, and coconut shell flour.

8. An adhesive as set forth in claim 1, for use in the manufacture of corrugated fibreboard.

9. An adhesive as set forth in claim 2, wherein said formaldehyde resin solution is selected from the group consisting the solutions of urea-formaldehyde, melamineformaldehyde, resorcinol-formaldehyde and ketone-formaldehyde.

10. An adhesive as set forth in claim 9, wherein said formaldehyde resin solution comprises a mixture of at least two of said formaldehyde resins.

11. An adhesive as set forth in claim 9, wherein said formaldehyde resin solution comprises a co-condensation product of at least two formaldehyde resins.

12. An adhesive as set forth in claim 9, 10 or 11, wherein said formaldehyde resins are modified with a substance selected from the group consisting of acetoguanamine, thiourea, ethylene urea, phenol, cresol, ethylenediamine, and diethylenetriamine.

13. An adhesive as set forth in any one of claims 2, 9, 10, or 11, wherein the quantity of said formaldehyde resin solution is from 5 to 50% by weight based on the total weight of said starches.

14. An adhesive as set forth in claim 13, wherein said quantity of said formaldehyde resin solution is from 10 to 25% by weight based on the total weight of said starches.

* * * * *